United States Patent [19]
Meffert

[11] Patent Number: 5,884,321
[45] Date of Patent: Mar. 16, 1999

[54] DOCUMENT IMAGE AND QUERY MANAGEMENT SYSTEM FOR APPLICATION DATABASES

[76] Inventor: Gregory John Meffert, 13 Drifler La., New Orleans, La. 70124

[21] Appl. No.: 948,653

[22] Filed: Oct. 10, 1997

Related U.S. Application Data

[63] Continuation of Ser. No. 408,710, Mar. 22, 1995, abandoned.

[51] Int. Cl.⁶ .................................................. G06F 17/30
[52] U.S. Cl. .......................................... 707/104; 707/100
[58] Field of Search ..................................... 707/104, 100

[56] References Cited

U.S. PATENT DOCUMENTS

| | | | |
|---|---|---|---|
| 4,468,732 | 8/1984 | Raver | 364/200 |
| 4,817,050 | 3/1989 | Komatsu | 364/900 |
| 4,907,188 | 3/1990 | Toshika | 364/900 |
| 4,958,283 | 9/1990 | Toshika | 364/413.13 |
| 5,012,405 | 4/1991 | Hitachi | 364/200 |
| 5,050,071 | 9/1991 | Harris | 364/200 |
| 5,089,956 | 2/1992 | IBM | 395/600 |
| 5,093,911 | 3/1992 | IBM | 395/600 |
| 5,101,345 | 3/1992 | IBM | 395/800 |
| 5,179,718 | 1/1993 | IBM | 395/800 |
| 5,185,857 | 2/1993 | Rozmanith | 395/148 |
| 5,201,048 | 4/1993 | Axxess | 395/600 |
| 5,206,951 | 4/1993 | Khoyi et al. | 395/683 |
| 5,257,369 | 10/1993 | Skeen et al. | 395/650 |
| 5,280,609 | 1/1994 | IBM | 395/600 |
| 5,345,586 | 9/1994 | Hamala et al. | 395/650 |
| 5,404,435 | 4/1995 | Rosenbaum | 395/147 |
| 5,455,945 | 10/1995 | Vanderdrift | 395/600 |
| 5,581,760 | 12/1996 | Atkinson | 395/700 |

OTHER PUBLICATIONS

System Administrator's Guide for ZYDECO Document and Information Management System.
Administrator's Guide for ZYDECO Utilities.

*Primary Examiner*—Thomas G. Black
*Assistant Examiner*—Donald Min
*Attorney, Agent, or Firm*—Finnegan, Henderson, Farabow, Garrett & Dunner, L.L.P.

[57] ABSTRACT

Users define virtual views to generate and execute queries across one or more existing application databases in order to implement new applications, including applications that require viewing images linked to existing database records. Mainframe, minicomputer or client-server computer system-based users link electronic documents stored in distributed or centralized image storage volumes on a PC-based system to existing database records, and retrieve those electronic documents when the linked database record is retrieved.

14 Claims, 9 Drawing Sheets

FIG. 3

DOCUMENT IMAGE AND QUERY MANAGEMENT SYSTEM FOR APPLICATION DATABASES

This is a continuation of application Ser. No. 08/408,710, filed Mar. 22, 1995, now abandoned.

BACKGROUND OF THE INVENTION

A. Field of the Invention

This invention relates generally to database systems and document imaging systems. The present invention facilitates the use of existing databases with document images by linking the images to database records.

B. Description of the Related Art

Medium to large size computer user groups have spent large sums of money in developing multiple, independent application databases on mainframe, minicomputer, and client-server computer systems. When seeking to add the functionality of an image processing application, however, these users encounter a significant obstacle. Specifically, image processing application developers have focused most development efforts on a different platform, i.e., the personal computer (PC). This difference in platforms, and the corresponding incompatibility between the PC and the other platforms, makes it difficult for users to integrate their older databases on mainframe, minicomputer and client-server computer systems with an image processing application.

Users needing access to both database and image processing applications must therefore select from the following unattractive and expensive alternatives to accommodate their need for both technologies. They can install a new database application on a PC platform with image processing functions. This option requires a major re-recording, re-educating and re-design effort to adapt the databases to the PC platform. Alternatively, users can employ the expensive and typically underdeveloped image processing products designed for mainframe, minicomputer and client-server computer systems.

Neither option, however, really allows the user to make full use of its existing investment in the database application. For example, database applications for the PC are not as sophisticated as those on mainframes. Moving the database from the mainframe to the PC is thus likely to result in a significant loss of functionality that may, in turn, affect the user's ability to use the database effectively in day-to-day operations.

There is, therefore, a need for a system that bridges the gap between existing mainframe, minicomputer or client-server databases and PC platform image processing applications. Such a system would preferably allow users to leave database applications intact and, at the same time, allow them to develop new applications using those databases tightly interfaced with image processing capabilities. Further, the system would allow users to maintain the integrity of information in existing databases, and not require re-keying any information from the databases into a new PC-based image processing application.

SUMMARY OF THE INVENTION

Accordingly, systems and methods consistent with the present invention substantially obviate one or more of the problems due to limitations, shortcomings, and disadvantages of the related art by providing a system comprised of at least two platforms, a first one of the platforms executing a database management application and a second one of the platforms executing an image processing application, a method of linking images to records in the database comprising the steps of:

receiving an identifier for a database record for the database management application;

receiving an identifier for a stored image for the image processing application; and linking the database record and the image.

BRIEF DESCRIPTION OF THE DRAWINGS

The accompanying drawings, which are incorporated in and constitute a part of this specification, illustrate systems and methods consistent with the invention and, together with the description, explain the advantages and principles of the invention.

FIG. 3 is an exemplary screen display of the results of a query using a virtual view (see FIG. 6).

DETAILED DESCRIPTION

Reference will now be made in detail to a system and method consistent with the present invention. Wherever possible, the same reference numbers will be used throughout the drawings and the following description to refer to the same or like parts.

Overview

Systems consistent with the present invention enable users to define virtual views that give the mainframe, minicomputer or client-server computer system-based user a PC-based method to generate and execute queries across one or more existing application databases in order to implement new applications, including applications that require viewing images linked to existing database records, with little or no required system development directly involving the existing database applications. Systems consistent with the present invention also enable the mainframe, minicomputer or client-server computer system-based user a PC-based method to link electronic documents stored in distributed or centralized image storage volumes to existing database records, and to retrieve those electronic documents when the linked database record is retrieved. This retrieval function is preferably accomplished using the virtual view discussed above.

The link between the images and the application database records is preferably accomplished using a pointer in the application database tables, rather than storing the electronic documents themselves in a database application. In this fashion, the user does not have to re-key information from the application database into the PC-based image handling system. Thus, the existing application database system is minimally affected and yet the image applications are linked to current database data. The pointer system used to store and locate images also facilitates the potential use of decentralized storage of images at the individual PC level while maintaining centralized control to and access to the existing application databases.

System Process

Figure 1:
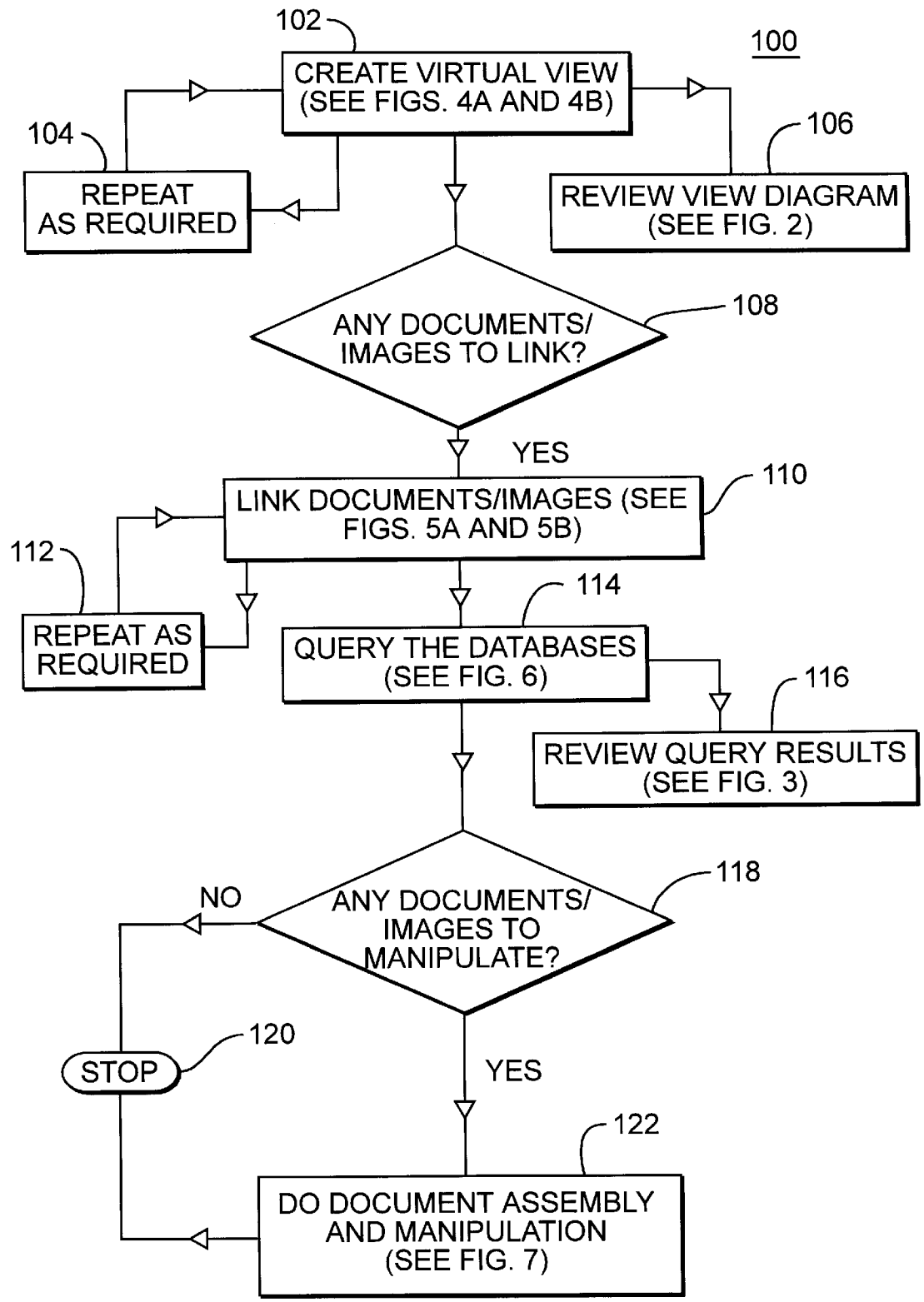
FIG. 1 is flow chart showing the software modules of a document imaging and database management system consistent with the present invention.
Figure 2:
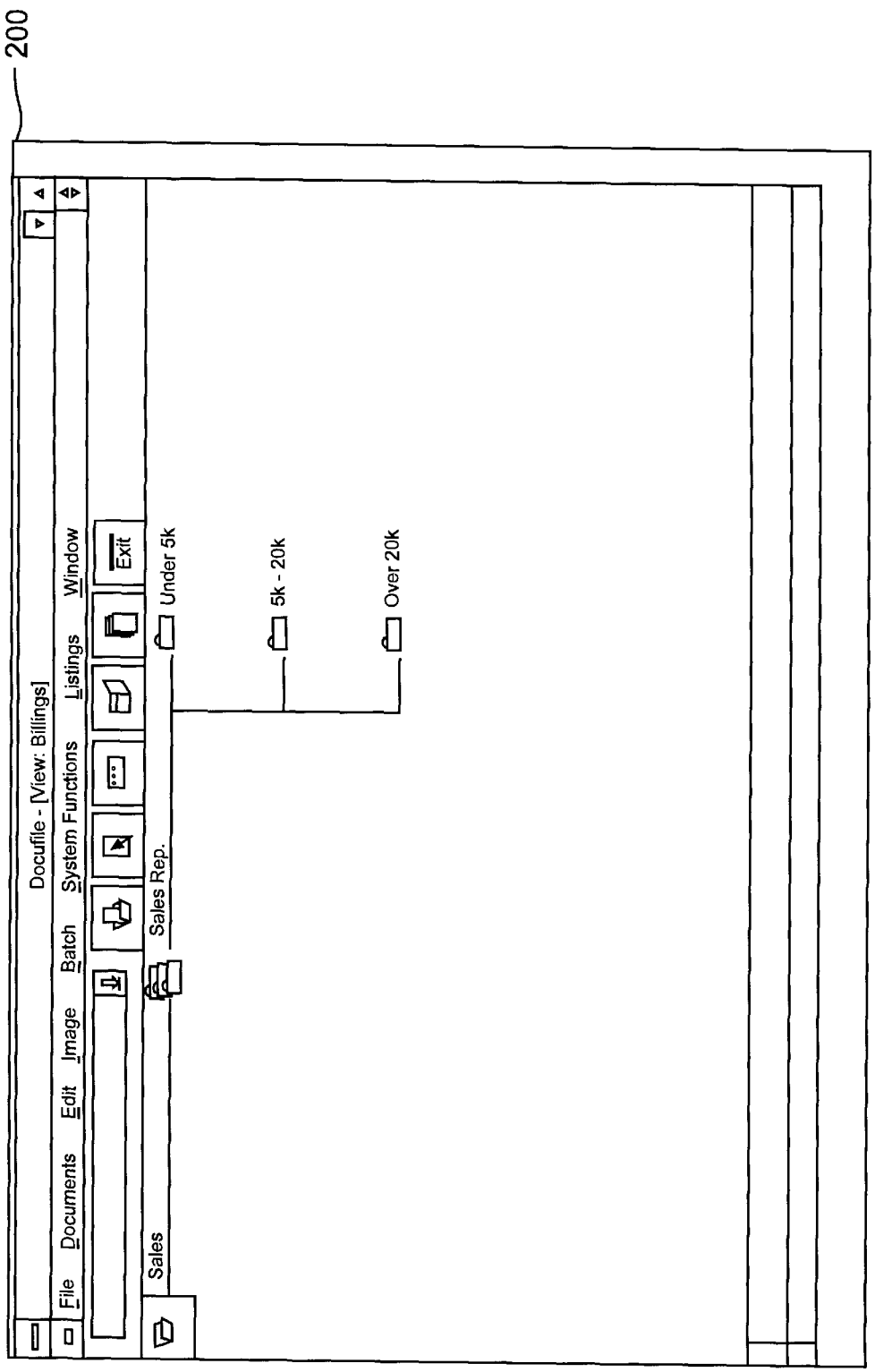
FIG. 2 is an exemplary virtual view created using a virtual view creating module of the document imaging and database management system (see FIGS. 4A and 4B).

FIG. 1 is a flow chart 100 of the steps performed by a document imaging and database management system consistent with the present invention. First, the user creates a virtual view using the functions provided by a virtual view creating module (step 102). In general, a virtual view is a graphical representation showing the relationship between stored files containing, for example, databases or electronic documents (i.e., electronic versions of images of documents). The operation of the virtual view creating module will be explained in detail below with reference to FIGS. 4A and 4B. As indicated in FIG. 1, the operation of the virtual view creating module (step 102) is preferably repeated as required to create the requested virtual views (step 104). The system also permits the user to display a virtual view (step 106), an example 200 of which is shown in FIG. 2.

If the user selects the function to link document images with database entries (step 108), then the operation of the linking module is initiated (step 110). By creating a link between a database record and an electronic document, the user can access the electronic document when the linked database record is retrieved. The operation of the linking module for linking database entries from existing databases to input images will be explained in detail below with reference to FIGS. 5A and 5B. The operation of the linking module (step 110) is preferably repeated as required to create the requested links (step 112).

Figure 3:
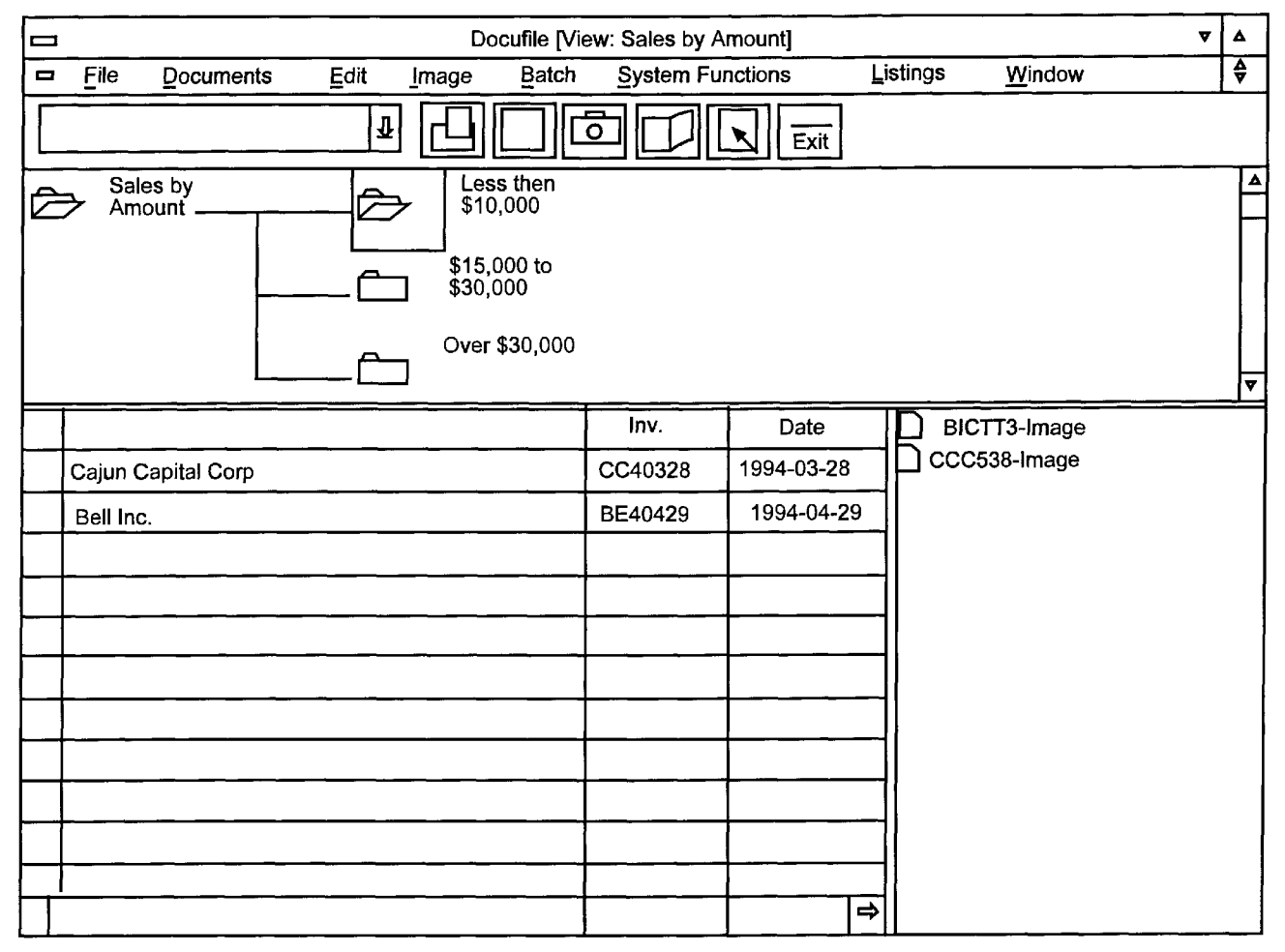

After a user creates links between database entries and stored document images, the user can query the database to retrieve not only database entries but also corresponding, linked electronic documents. Retrieval is accomplished using a database query module (step 114). The operation of the database query module will be explained in detail below with reference to FIG. 6. In addition, the results of a query can be displayed (step 116), and FIG. 3 illustrates the display 300 of a query result.

Additionally, the document imaging and database management system enables users to manipulate the stored documents/images in response to a request (step 118). If the user does not request this function, the system does not perform it (step 120). If, however, the manipulation function is selected, then the system enables the user to manipulate the stored documents/images (step 122). This includes accessing database records or document images and modifying them as well. The operation of the document manipulation module will be explained in detail below with reference to FIG. 7.

Figure 4A:
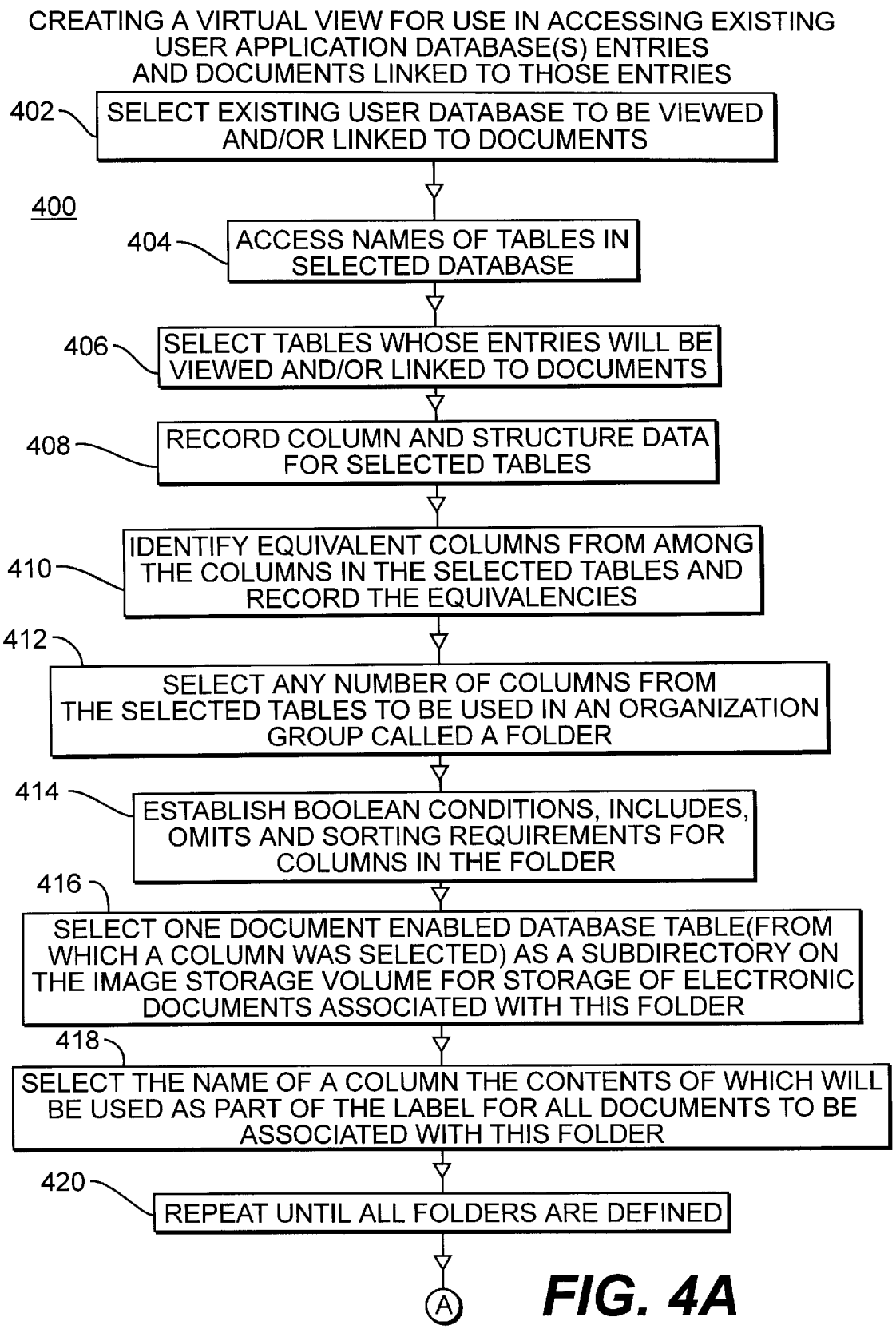
FIGS. 4A and 4B are flow charts of the steps used by the virtual view creating module to enable users to create virtual views.
Figure 4B:
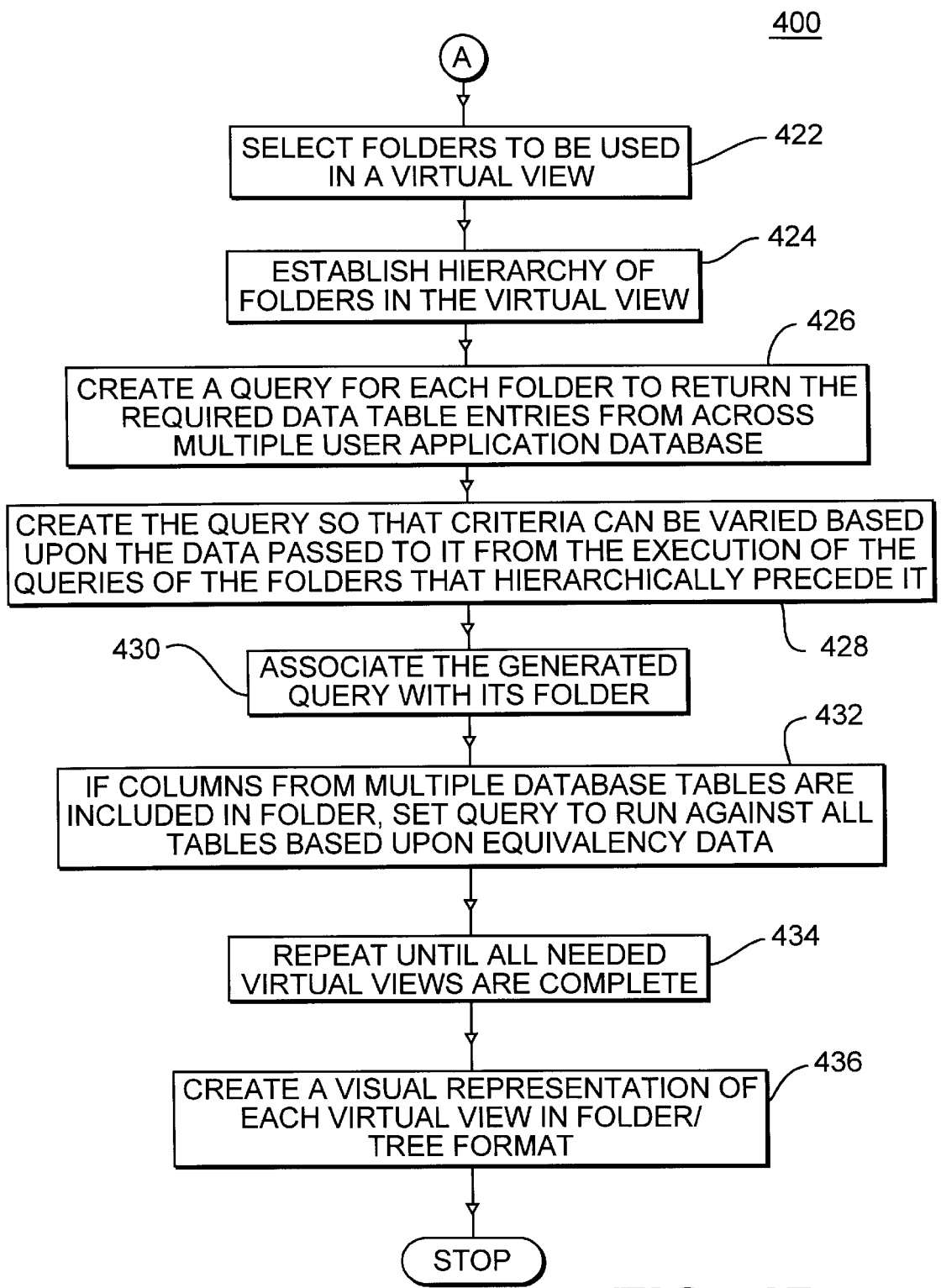

Creating a Virtual View for use in Accessing Existing User Application Database Entries and Documents Linked to those Entries FIGS. 4A and 4B are flow charts 400 of the steps used by the virtual view creating module to create virtual views. In general, the system employs a graphical user interface (hereinafter "GUI") for all input/output operations.

A. Virtual view creating begins with the user inputting the name of an external database to be viewed and/or associated with electronic documents (step 402);

B. The system then accesses the external database tables within the named external database (step 404);

C. The system in turn displays the names of the external database tables within the named external database, and allows the user to select from the displayed items the particular external database tables to be mapped (step 406);

D. After the user selects a table, the system records in a database table for internal use the name and description of the data columns in the external database tables selected for mapping (step 408);

E. After the structure of all the selected external database tables are recorded in the internal mapped tables, the system prompts the user for the names of equivalent data columns occurring in multiple internal mapped tables (even if assigned different names in different internal mapped tables), and records the identity of the equivalent data columns in the internal database tables (step 410).

As an alternative to steps A through E above, the system can interface directly with a user written program to obtain the name of the external database to be queried and/or to be associated with document images, the name of the external database tables to be mapped, and the name of equivalent data columns in the resulting internal mapped tables.

F. The system displays to the user the data columns in each of the internal mapped tables, and allows the user to select from the displayed data columns those columns to be used as an organizational unit called a set of folder indexes (step 412).

G. In response to the user's selection, the system displays the data columns in a set of folder indexes, allows the user to create optional boolean conditions, including omits and/or sorting requirements on any one or more of the data columns in a set of folder indexes, and links all the created optional conditional restrictions and/or sorting requirements to the set of folder indexes to form an organizational unit called a folder that is used as the basic unit for inquiry into the external database and the external image volumes (step 414);

H. The user then selects one document enabled database table from which a column was selected as the name of a subdirectory (called a cabinet) on the image storage volume for storage of electronic documents associated with the folder (step 416);

I. The user also selects the name of a column, the contents of which will be used as part of the label for all documents to be associated with the folder (step 418);

J. The user can instruct the system to repeat steps F through I above until all desired folders are defined (step 420);

K. After the folders are defined, the system displays them and allows the user to select those folders that are to be included in an organizational unit to be called a set of view folders (step 422);

L. The user can then select (1) a folder from the set of view folders to be identified as a parent folder for the set of view folders, (2) a folder or folders as subordinates to the parent folder (hereinafter "child folder"), and (3) one or more folders as subordinates to any child folder, which selections are then used by the system to display parent-child hierarchical relationships formed in a folder/tree format and to store the set of view folders and their associated hierarchical structure relationship in an organizational unit called a virtual view (step 424);

M. Once the creation of the virtual view is complete, the user selects an option to query each folder within each virtual view to access the external database and to dynamically modify the external database based upon the folder's position in the hierarchical structure and the combined results of the execution of the query of all the folders that precede it in the hierarchy in the virtual view. When run against the results of the queries from the folders that precede it hierarchically within the same virtual view, the system preferably returns from the external database tables a set, or sets, of returned data entries that meet the content and other restrictions of the particular folder (steps 426 and 428);

N. The system assigns a user query to the folder in which the query was applied. If columns from multiple database tables are included in a folder, the system sets the query to run against all tables based upon equivalency data specified by the user (steps 430 and 432);

O. The system further allows the user to repeat steps K through N above until all needed virtual views are complete (step 434); and P. The system creates a visual representation of each virtual view in the folder/tree format (step 436).

Figure 5A:
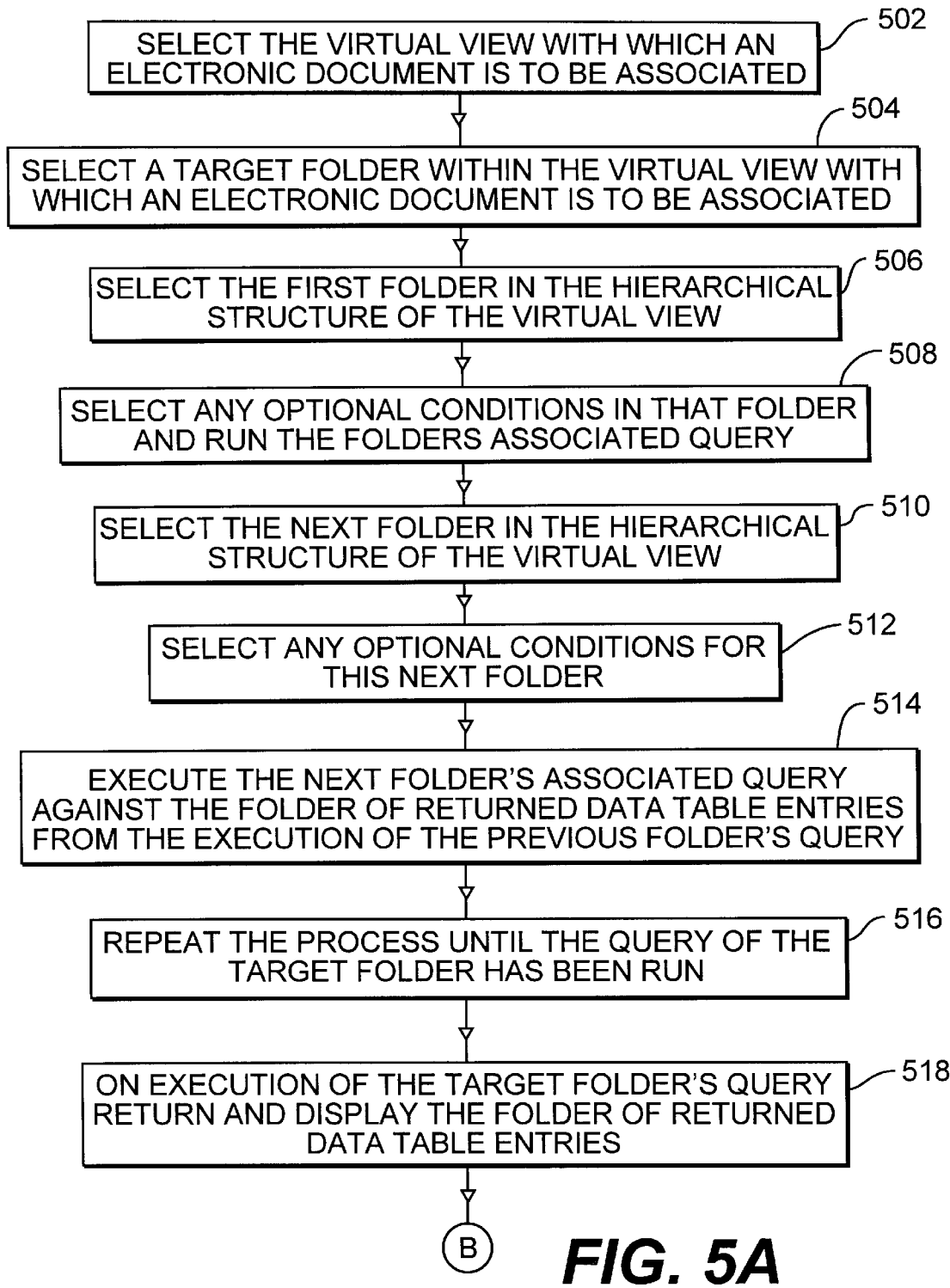
FIGS. 5A and 5B are flow charts of the steps used by a module to enable users to link document images with entries in existing application databases.
Figure 5B:
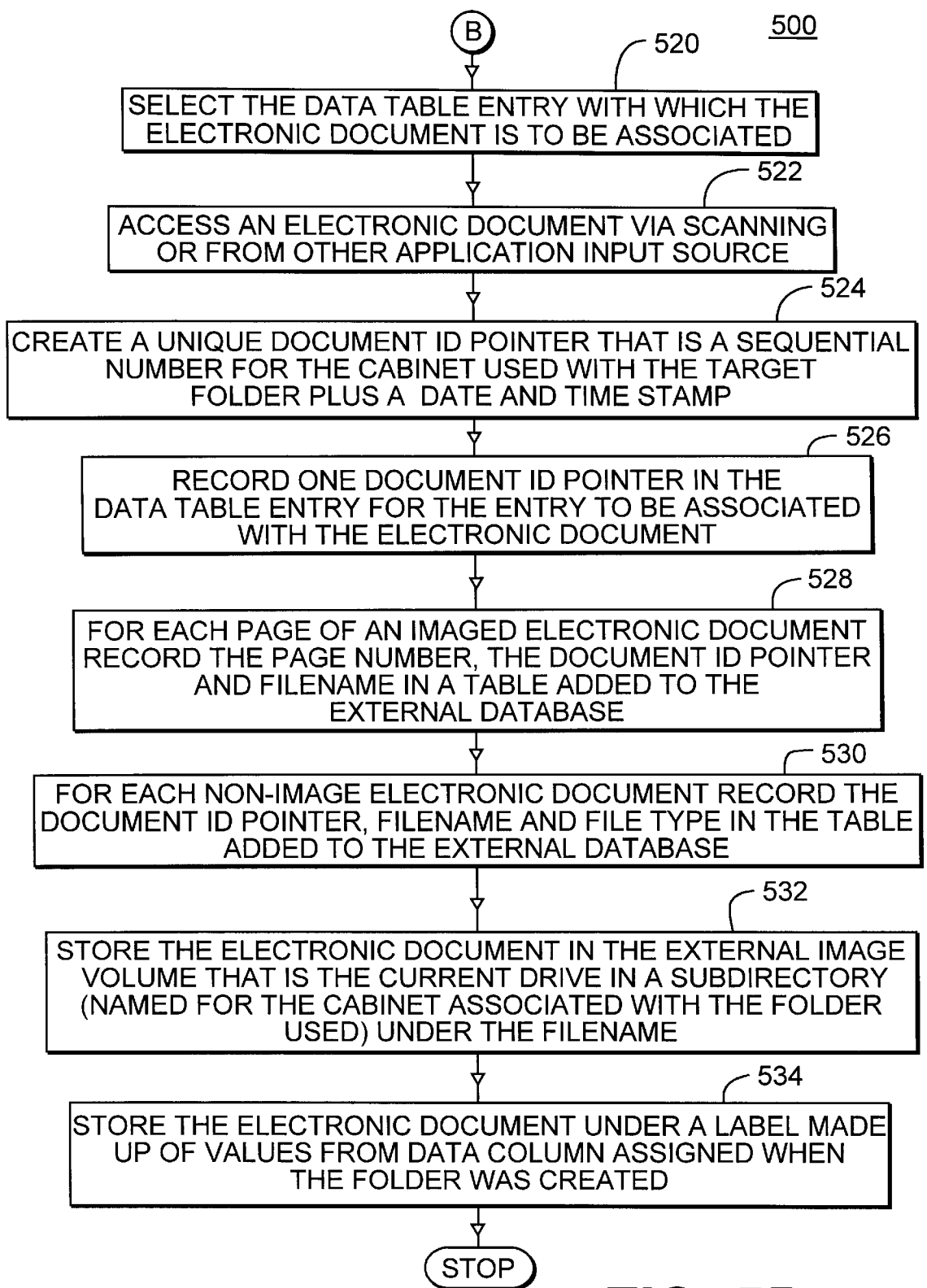

Linking an Electronic Document—to be Stored in Distributed Image Storage Volumes—to a Data Table Entry in an Existing Application Database FIGS. 5A and 5B are flow charts 500 of the steps used by a system module to link document images with entries in existing application databases.

A. First, the system displays a selected virtual view, which was previously defined by the user, as the target view for linking (step 502);

B. The system displays the target view in the folder/tree format that permits the user to select a folder from the target view display as the target folder with which a source electronic document will be associated (step 504);

C. The user selects the first folder in the hierarchical structure of the virtual view (step 506);

D. The user also selects any optional conditions in that folder and instructs the system to run the folder's associated query (step 508);

E. The user can then select the next folder in the hierarchical structure of the virtual view (step 510);

F. The user can also select any optional conditions for this next folder (step 512);

G. The system then runs the next folder's associated query against the folder of returned data table entries from the execution of the previous folder's query (step 514);

H. The system repeats this folder selection/query process until the query of the target folder is executed (step 516);

I. On execution of the target folder's query, the system displays the folder of returned data table entries using the GUI (step 518);

J. The user can also select the data table entry with which the electronic document is to be associated (step 520);

K. The system then accesses an electronic document via scanning or from other application input source (step 522);

L. At this point, the system creates a unique document ID pointer that is a sequential number for the cabinet used with the target folder plus a data and time stamp (step 524);

M. The system also records one document ID pointer in the data table entry for the entry to be associated with the electronic document (step 526);

N. For each page of an imaged electronic document record the page number, the system adds a document ID pointer and filename to a table in the external database (step 528);

O. For each non-image electronic document record the document ID pointer, the system adds a filename and file type in the table in the external database (step 530);

P. The system stores the electronic document label, which includes a data column value associated with when the folder was created in the table added to the external data table (step 532); and Q. The system stores the electronic document in the external image volume, that is the current drive, in a subdirectory, named for the cabinet associated with the folder used, under the filename (step 534).

The steps A through Q above may be repeated until all electronic documents are linked to database entries.

Figure 6:
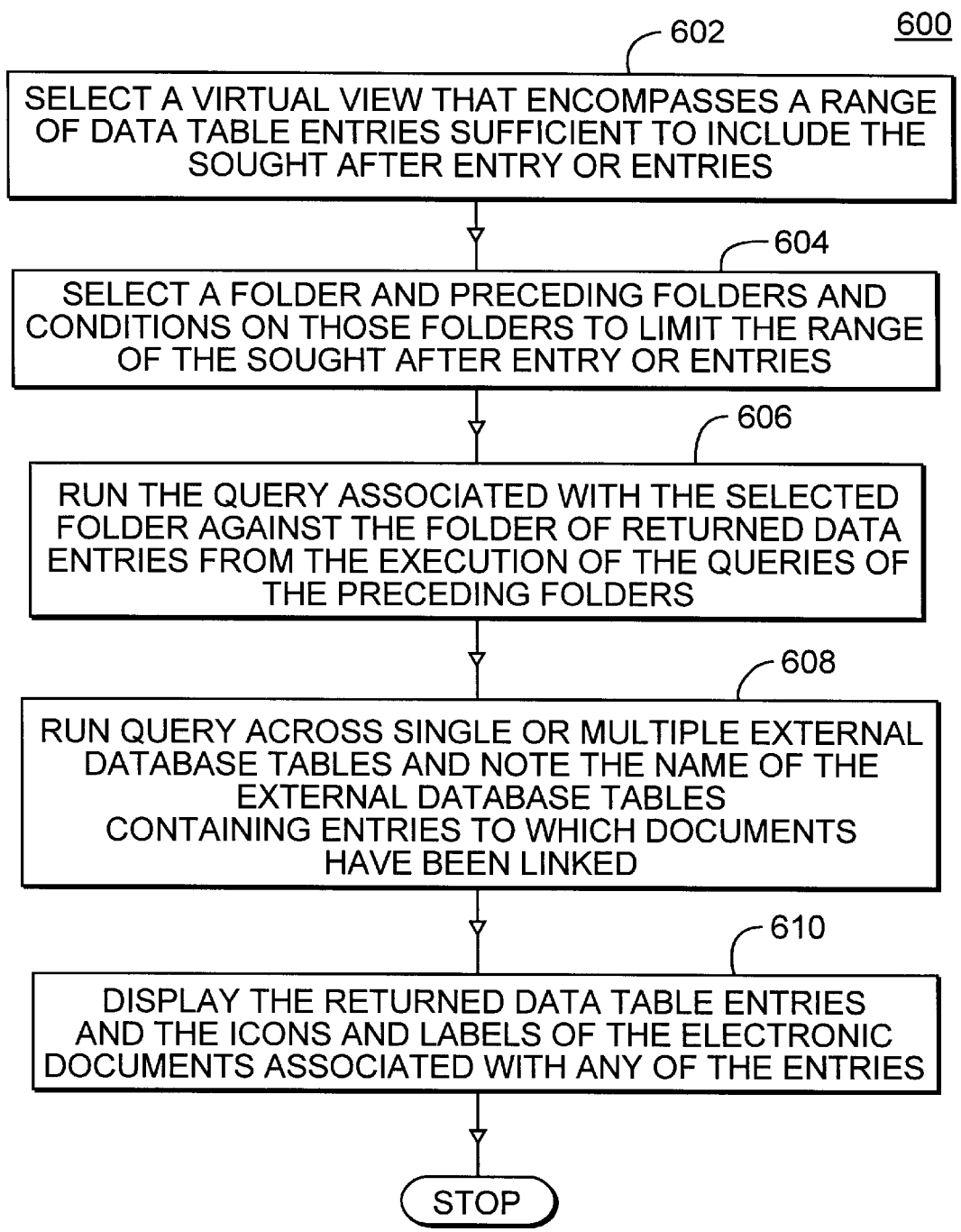
FIG. 6 is a flow chart of the steps of a query module to enable users to employ virtual views to query an existing application database.

Using a Virtual View to Query Existing Application Database to Return Data Table Entries and Electronic Documents Linked to those Entries FIG. 6 is a flow chart 600 of the steps of a query module to enable users to employ virtual views to query an existing application database.

A. First, the user selects a virtual view that encompasses a range of data table entries sufficient to include the sought after entry or entries (step 602);

B. Using the selected virtual view, the user can choose a folder and preceding folders and conditions on those folders to limit the range of the sought after entry or entries (step 604);

C. The system in turn runs the query associated with the selected folder against the folder of returned data entries from the execution of the queries of the preceding folders (step 606);

D. The system also runs the query across multiple external database tables and notes the name of the external database tables containing entries to which documents have been linked (step 608); and E. Using the GUI, the system display the returned data table entries and the labels of the electronic documents associated with any of the entries (step 610).

Figure 7:
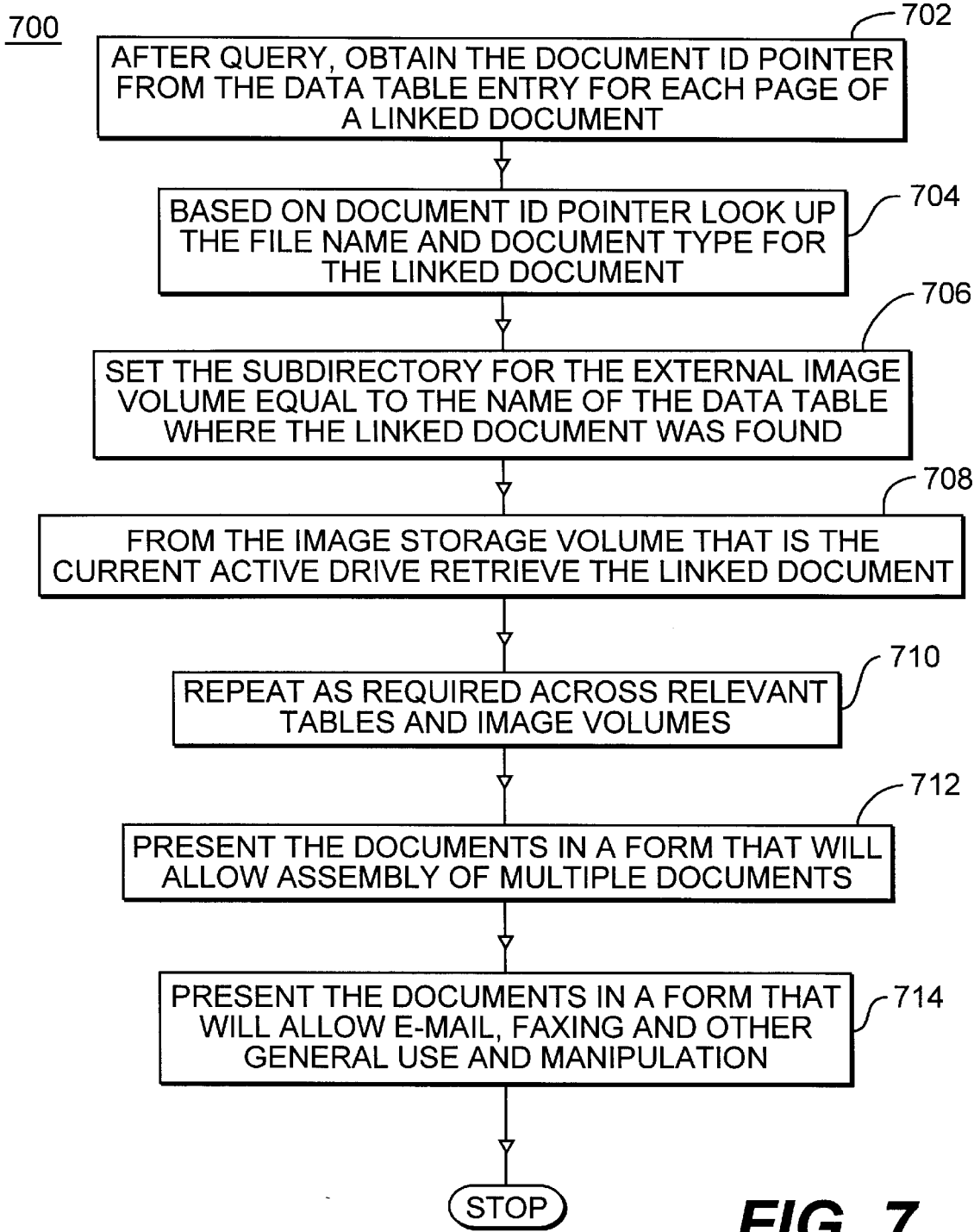
FIG. 7 is a flow chart of the steps used by a document assembly and manipulation module to enable users to view and/or manipulate electronic documents associated with the database table entries returned in response to a query.

Document Assembly with and Otherwise Manipulate Electronic Documents Including Images and Application Generated Documents Such as Word Processing Documents and Spreadsheets FIG. 7 is a flow chart 700 of the steps used by a document assembly and manipulation module to enable users to view and/or manipulate electronic documents associated with the database table entries returned in response to a query.

A. After resolving a query, the system obtains the document ID pointer from the entry in the data table added to the external database, for each page of the linked documents (step 702);

B. Based on the document ID pointer, the system determines the filename and document type for the linked documents (step 704);

C. The system then sets the subdirectory for the external image volume equal to the name of the data table where the linked documents were found (step 706);

D. The system also retrieves the linked documents from the image storage volume that is the current active drive (step 708);

E. Steps A through D may be repeated across all relevant tables and image volumes (step 710);

F. The system then presents the documents in a form that allows assembly of multiple documents (step 712); and G. The system presents the documents in a form that will allow e-mail, faxing and other general use and manipulation (step 714).

Conclusion

In this manner a document image and database management system consistent with the present invention manages electronic documents. Methods and systems consistent with the present invention include:

1. A software implemented electronic documents management method comprising:

a. Mapping structure information from data base tables within one or more of a user's selected existing application data bases to internal data base tables (hereinafter the user's selected existing application data base or data bases are collectively referred to as the "external data base(s)," the tables in the external data base(s) whose structures have been mapped are collectively referred to as the "external data base tables" and the external data base tables' structures as mapped in internal data base tables are collectively referred to as the "internal mapped tables");

b. Adding columns to the external data base tables and creating new data base tables in the external data base, for internal use, both used for storage of the data necessary to link electronic documents, that, if images, will be stored in image storage volumes and if from application output in volumes controlled by the application, to selected entries in the external data base tables (the image storage volumes are hereinafter referred to as the "external image volumes");

c. Creating an organizational structure to be used when storing electronic documents on the external image volumes made up of first level storage references, based on, and named for, internal mapped tables that are selected to have electronic documents associated with them, and field references within the first level storage references, based on, and named for, data columns from within any internal mapped table (the first level storage references are hereinafter referred to as "cabinets," the selected internal mapped tables the cabinets are named for are hereinafter referred to as "document enabled tables," and the field references are hereinafter referred to as the "cabinet indexes");

d. Selecting, from the data columns within the structure of one or more of the internal mapped tables, one or more sets of data columns to be utilized as an organizational unit (each organizational unit composed of selected data columns is hereinafter referred to as a "set of folder indexes");

e. If required, setting boolean conditions, includes, omits and/or sorting requirements on one or more of the data columns in any of the sets of folder indexes to delimit or organize the data to be accessed and/or displayed when a particular set of folder indexes is used (a set of folder indexes combined with its restrictions is hereinafter collectively referred to as a "folder");

f. Selecting from created folders, one or more sets of folders to be utilized as an organizational unit (each set of folders to be utilized as an organizational unit is hereinafter referred to as a "set of view folders");

g. Defining a hierarchical structure relationship between the folders in each set of view folders (each set of view folders combined with its hierarchical structure is hereinafter referred to as a "virtual view").

h. For each folder within each virtual view, generating a query, capable of accessing the external data base(s) that can be dynamically modified based upon the folder's position in the hierarchical structure and the combined results of the execution of the queries of all the folders that precede it, hierarchically, in the Virtual View. So that, when run, against the results of the queries from the folders that precede it hierarchically within the same virtual view, it will return from the external data base tables a set, or sets, of returned data entries that meet the content and other restrictions of the particular folder (hereinafter the query for each folder is referred to as the "generated query");

i. Associating the generated query for each folder with that folder (associating the generated query is hereinafter referred to as "imbedding the generated query");

j. Accessing an electronic document from an external source (the electronic document accessed is hereinafter referred to as the "source electronic document");

k. Selecting from the previously generated virtual views, the particular virtual view and the particular folder within that virtual view with which the source electronic document is to be associated (the selected virtual view and the selected folder within the selected view are hereinafter referred to as the "target view" and "target folder" respectively);

l. From among all the folders that precede the target folder within the hierarchical structure of the target view, selecting any optional conditions, includes, omits and/or sort requirements on those folders as required to further delineate the range of external data base table entries with which the source electronic document is to be associated (all the preceding folders and associated optional restrictions are hereinafter collectively referred to as the "selected preceding folders");

m. Executing the generated query imbedded in the target folder against the results from the execution of the queries imbedded in the selected preceding folders (the generated query of the target folder run against the folder of returned data table entries from the execution of the generated queries of the selected preceding folders is hereinafter referred to as the "combined query") to return from the external data base tables the set, or sets, of external data base table entries that satisfy the content and other restrictions of the target folder within the target view (all the entries returned by the execution of the combined query are hereinafter collectively referred to as a "folder of returned data table entries" and any one particular set of data table entries within the folder of returned data entries is referred to as a "returned folder entry");

n. Selecting from the folder of returned data table entries a returned folder entry with which the source electronic document is to be linked (the selected returned folder entry is hereinafter referred to as the "selected folder entry");

o. Selecting the cabinet within the external image volumes to be used for the storage of the source electronic document as well as to be used for all other electronic documents that are to be associated with the target folder (the selected cabinet is hereinafter referred to as the "selected cabinet");

p. Determining, from values of certain data columns added to the external data base tables for the selected folder entry, whether or not any electronic documents have been previously linked to the selected folder entry (the data columns added to the external data base tables to provide a pointer, to electronic documents not stored in the external data base are hereinafter referred to as the "document ID pointer," and the values of the data columns added to the external data base tables for a particular electronic document are hereinafter collectively referred to as the "document ID pointer values");

q. If electronic document(s) have been previously linked to the selected folder entry, retrieving the document ID pointer values assigned to the selected folder entry and, if no electronic documents have been previously linked to the selected folder entry, generating an entry, unique within the selected cabinet, for the document ID pointer values, a file name and a label, to be associated with the source electronic document that is linked to the selected folder entry (the document ID pointer values retrieved or generated are hereinafter referred to as the "document ID");

r. Determining the specified active drive;

s. Storing the source electronic document in a subdirectory, named for the selected cabinet, of the external storage volume that is the specified active drive;

t. Recording the document ID in the document ID pointer value fields;

u. After a group of one or more source electronic documents have been so linked to selected folder entries in the external data base tables, accessing any desired folder of returned data table entries by selecting a folder within a virtual view and executing the resulting combined query against the results of the embedded generated queries of the selected preceding folders and displaying the folder of returned data table entries that will now include document IDs in the document ID pointers which along with the names of the selected Cabinets can be translated into the location for any electronic documents that have been previously linked to any of the folder of returned data table entries (the linked electronic documents so indicated are hereinafter referred to as the "linked electronic documents");

v. Manipulating as required, including sorting, retrieving, reorganizing, viewing, printing, faxing, e-mailing, and assembling the linked electronics documents.

2. Mapping structure information from data base tables of Step A of item 1 further comprising:
  a. Using a graphical user interface (the graphical user interface is hereinafter referred to as a "GUI"), obtaining from a user the name of an external data base(s) to be accessed and/or with which electronic documents are to be associated;
  b. Accessing the external data base tables within the named external data base(s);
  c. Using a GUI, presenting to the user the names of the external data base tables within the named external data base;
  d. Using a GUI, allowing the user to select, from the presented external data base tables, the particular external data base tables to be mapped;
  e. Recording in a data base table for internal use the name of, and description of, the data columns in the external data base tables for those external data base tables selected for mapping;
  f. After the structure of all the selected external data base tables are recorded in the internal mapped tables, using a GUI, obtaining from the user the names of equivalent data columns occurring in multiple internal mapped tables even if assigned different names in different internal mapped tables;
  g. Recording in the internal data base tables, the identity of the equivalent data columns.

3. Mapping structure information from data base tables of Step A of item 1 further comprising:
  a. Through a direct interface with a user written program obtain the name of the external data base(s) to be inquired against and/or to have documents associated with, the name of the external data base tables to be mapped, and the name of equivalent data columns in the resulting internal mapped tables.

4. Creating an organizational structure to be used when storing electronic documents on the external image volumes of Step C of item 1 further comprising:
  a. Using a GUI, obtaining from the user the name of each of the internal mapped tables that contain data table entries with which the user wants to associate electronic documents;
  b. Creating cabinets named for each of the internal mapped tables that the user wants document enabled;
  c. Using a GUI, display to the user the names of the data columns in each of the internal mapped tables for which a cabinet is created;
  d. Using a GUI, allow the user to select, from the displayed data columns, the data columns to be used as cabinet indexes.

5. Selecting one or more sets of data columns to be utilized as an organizational unit of Step D of item 1 further comprising:
  a. Using a GUI, displaying to a user all the data columns in each of the internal mapped tables;
  b. Using a GUI, allowing the user to select, from the displayed data columns, those columns to be used as an organizational unit called a set of folder indexes.

6. Setting boolean conditions, includes, omits and/or sorting requirements on one or more of the data columns in a set of folder indexes of Step E of item 1 further comprising:
  a. Using a GUI, displaying to the user the data columns in a set of folder indexes;
  b. Using a GUI, allowing the user to create optional boolean conditions, includes, omits and/or sorting requirements on any one or more of the data columns in a set of folder indexes;
  c. Linking all the created optional conditional restrictions and/or sorting requirements to the set of folder indexes to form an organizational unit called a folder that is to be used as the basic unit for inquiry into the external data base(s) and as a result into the external image volumes.

7. Selecting one or more sets of folders to be used as an organizational unit of Step F of item 1 further comprising;
  a. Using a GUI, displaying to the user the existing folders;

b. Using a GUI, allowing the user to select, from the displayed folders, the folders that are to be included in an organizational unit to be called a set of view folders.

8. Defining the hierarchical structure relationship of a set of folders to be displayed together of Step G of item 1 further comprising:
   a. Using a GUI, allowing the user to select a folder, from a set of view folders, as the parent folder for the set of view folders;
   b. Using a GUI, allowing the user to select a folder or folders as subordinates to the parent folder (hereinafter the subordinate folder is referred to as a child);
   c. Using a GUI, allowing the user to select one or more folders as subordinates to any child folder;
   d. Using a GUI, displaying the parent-child hierarchical relationships being formed in a folder/tree format;
   e. Storing the set of view folders and their associated hierarchical structure relationship in an organizational unit called a virtual view.

9. Selecting a target view and a target folder within that target view of Step K of item 1 further comprising:
   a. Using a GUI, displaying to the user the virtual views that have been defined and allowing the selection of one virtual view as the target view;
   b. Using a GUI, displaying, in a folder/tree format, the folders and the structure of the target view;
   c. Using a GUI, allowing the user to select a folder, from the target view display, as the target folder with which the source electronic document is to be associated.

10. Selecting preceding folders and optional conditions of Step L of item 1 further comprising:
    a. Using a GUI, displaying, in a folder/tree format, the folders and available conditions on those folders in the target view;
    b. Using a GUI, allow the user to sequentially select from the folders that hierarchically precede the target folder all the required folders and optional boolean conditions, includes, omits and/or sort requirements needed to properly limit the folder of returned data table entries desired by the user.

11. Executing the generated query imbedded in the target folder against the folder of returned data table entries from the queries of the selected preceding folders of Step M of item 1 further comprising;
    a. Sequentially executing the queries imbedded in the folders that precede the target folder;
    b. Executing the query imbedded in the Target Folder against the folder of returned data table entries.

12. Accessing any desired folder of returned data base entries of Step U of item 1 further comprising:
    a. Using a GUI, allowing the user to select a target view from the list of all virtual views;
    b. Using a GUI, displaying to the user the target view in a folder/tree structural organization;
    c. Using a GUI, allowing the user to select a target folder within the virtual view and any required preceding folders and/or optional boolean conditions, includes, omits and/or sort requirements on any of those folders;
    d. Executing the combined query of the selected preceding folders and running the imbedded query of the target folder against the resulting entries;
    e. Using a GUI, displaying to the user the folder of returned data table entries and the label of all electronic documents that have been linked to the returned folder entries.

13. Manipulating the linked electronic documents of Step V of item 1 as further comprising:
    a. Using a GUI, allowing the user to select any linked electronic document;
    b. Based upon the document ID pointer values determine the file name and file type and then based on the cabinet of the data base table and the current active drive, retrieving one or more of the linked electronic documents from the external image volumes;
    c. Using a GUI, allowing the user to organize, view, print, fax, email, do document assembly or otherwise manipulate the linked electronic documents.

What is claimed is:

1. A data processing method comprising the steps of:
   providing a database having a structure for storing a plurality of records;
   generating a virtual view corresponding to the database structure;
   providing a plurality of images;
   receiving an identifier for one of the records of the database;
   receiving an identifier for a stored image; and
   modifying the identified record with a logical connection to the identified image.

2. A method of accessing stored images comprising the steps of:
   providing a database management application to manage a plurality of database records;
   generating a virtual view corresponding to a structure of the database records;
   providing image processing application to manage a plurality of images;
   receiving a request for a database record;
   determining whether the requested database record indicates a logical connection to one of the images; and
   retrieving and displaying the image.

3. A method of linking information, comprising the steps of:
   displaying a virtual view of first and second servers;
   receiving identifiers selecting record information from the first server and image information from the second server;
   modifying the record information to reflect a logical connection with the image information from the second server; and
   retrieving the image information from the second server via the logical connection.

4. A method for use in managing an existing external database, comprising the steps, performed by a processor, of:
   receiving information selecting the external database to be linked to existing documents, wherein the external database includes a set of tables each having a plurality of columns;
   recording structure information for the selected external database, including identifiers corresponding to selected columns of the tables;
   designating a selected set of column identifiers as a folder; and
   receiving an identifier for a selected table corresponding to a selected column identifier to be used as a subdirectory for accessing the documents associated with the folder.

5. The method of claim 4, further comprising the step of:

displaying the folder as part of a virtual view of the external database.

6. The method of claim 4, further comprising the steps of:

receiving an identifier for the folder as a selection for display as part of a virtual view; and establishing a hierarchy of additional folders in the virtual view, wherein the additional folders correspond to other selected column data.

7. A method for establishing a logical relationship between entries of external databases and electronic images, the method comprising the steps, performed by a processor, of:

receiving a selection identifying a virtual view, including a set of folders corresponding to at least one external database having a plurality of entries;

loading the selected virtual view, including a plurality of identifiers for the folder;

receiving an identifier for a selected folder;

receiving an identifier for a selected entry of the external database corresponding to the selected folder;

accessing a selected electronic document;

creating a unique document identifier for the selected electronic document; and associating the unique document identifier for the selected electronic document with the selected entry.

8. A data processing system comprising:

a memory including program instructions; and a processor configured to use the program instructions to:

generate a virtual view corresponding to a database having a structure for storing a plurality of records, receive an identifier for one of the records of the database, receive an identifier for a stored image, and modify the identified record with a logical connection to the identified image.

9. A data processing system comprising:

a memory including program instructions; and a processor configured to use the program instructions to:

generate a virtual view corresponding to a database having a structure for storing a plurality of records, receive a request for a database record, determine whether the requested database record indicates a logical connection to an image, and retrieving and displaying the image.

10. A data processing system comprising:

a memory including program instructions; and a processor configured to use the program instructions to:

display a virtual view of first and second servers, receive identifiers selecting record information from the first server and image information from the second server, modify the record information to reflect a logical connection with the image information from the second server, and retrieve the image information from the second server via the logical connection.

11. A data processing system comprising:

a memory including program instructions; and a processor configured to use the program instructions to:

receive information selecting an external database to be linked to existing documents, wherein the external database includes a set of tables each having a plurality of columns, record structure information for the selected external database, including identifiers corresponding to selected columns of the tables designating a selected set of column identifiers as a folder, and receive an identifier for a selected table corresponding to a selected column identifier to be used as a subdirectory for accessing the documents associated with the folder.

12. The system of claim 11, wherein the processor is further configured to:

display the folder as part of a virtual view of the external database.

13. The system of claim 11, wherein the processor is further configured to:

receive an identifier for the folder as a selection for display as part of a virtual view; and establish a hierarchy of additional folders in the virtual view, wherein the additional folders correspond to other selected column data.

14. A data processing system comprising:

a memory including program instructions; and a processor configured to use the program instructions to:

receive a selection identifying a virtual view, including a set of folders corresponding to at least one external database having a plurality of entries, load the selected virtual view, including a plurality of identifiers for the folders, receive an identifier for a selected folder, receive an identifier for a selected entry of the external database corresponding to the selected folder, access a selected electronic document, create a unique document identifier for the selected electronic document, and associate the unique document identifier for the selected electronic document with the selected entry.

* * * * *

UNITED STATES PATENT AND TRADEMARK OFFICE
CERTIFICATE OF CORRECTION

PATENT NO.: 5,884,321

DATED: March 16, 1999

INVENTOR(S): Gregory John Meffert

It is certified that an error appears in the above-identified patent and that said Letters Patent is hereby corrected as shown below:

Claim 7, col. 13, line 19, change "the folder" to --the folders--.

Signed and Sealed this

Twelfth Day of October, 1999

*Attest:*

Q. TODD DICKINSON

*Attesting Officer*    *Acting Commissioner of Patents and Trademarks*